United States Patent [19]

Pindar et al.

[11] 4,147,643
[45] Apr. 3, 1979

[54] ORGANIC COMPOSITIONS USEFUL AS ADDITIVES FOR FUELS AND LUBRICANTS

[75] Inventors: John F. Pindar, Euclid; Jerome M. Cohen, University Heights, both of Ohio

[73] Assignee: The Lubrizol Corporation, Wickliffe, Ohio

[21] Appl. No.: 697,177

[22] Filed: Jun. 17, 1976

Related U.S. Application Data

[63] Continuation-in-part of Ser. No. 661,906, Feb. 26, 1976, abandoned.

[51] Int. Cl.$^2$ .................. C10M 1/20; C10L 1/18; C08G 8/04
[52] U.S. Cl. .................. 252/52 R; 44/76; 44/78; 252/48.2; 252/48.6; 260/609 D; 568/727; 568/722; 528/130; 528/155; 528/159
[58] Field of Search .................. 252/52 R, 48.2, 48.6; 44/78, 76; 260/624 B, 619 A, 619 B, 609 D, 53 R

[56] References Cited

U.S. PATENT DOCUMENTS

| | | | |
|---|---|---|---|
| 2,147,547 | 2/1939 | Reiff et al. | 252/52 R |
| 2,412,589 | 12/1946 | Lieber | 252/52 R X |
| 2,422,276 | 6/1947 | Mikeska | 252/48.2 X |
| 2,613,230 | 10/1952 | Niederl | 260/619 A X |
| 2,623,855 | 12/1952 | Garner | 252/48.2 |
| 2,745,726 | 5/1956 | Young et al. | 44/78 |
| 2,914,540 | 11/1959 | Goddu et al. | 260/619 A X |
| 2,918,448 | 12/1959 | Viohl | 260/619 A X |
| 3,035,908 | 5/1962 | Gottshall et al. | 44/78 X |
| 3,336,226 | 8/1967 | Kautsky et al. | 44/78 X |
| 3,390,088 | 6/1968 | Griffing | 44/78 X |
| 3,392,118 | 7/1968 | Isaacson et al. | 252/52 R X |
| 3,492,234 | 1/1970 | Andress, Jr. et al. | 252/52 R X |
| 3,637,586 | 1/1972 | Meltsner | 44/76 X |
| 3,737,465 | 6/1973 | Karll et al. | 260/619 A |
| 3,793,201 | 2/1974 | Karn | 252/42.7 X |
| 3,849,085 | 11/1974 | Kreuz et al. | 44/78 |
| 3,876,620 | 4/1975 | Moss | 260/619 A X |
| 3,951,830 | 4/1976 | Karn | 252/48.2 X |
| 4,048,145 | 9/1977 | Moss | 260/619 B X |
| 4,053,428 | 10/1977 | Pindar et al. | 252/52 A |

*Primary Examiner*—Winston A. Douglas
*Assistant Examiner*—John Doll
*Attorney, Agent, or Firm*—James W. Adams, Jr.; Daniel N. Hall

[57] ABSTRACT

Compositions useful as additives for fuels and lubricants can be made by reacting (A) an aromatic compound having an OH or SH group attached to an aromatic nucleus and an aromatic hydrogen atom (e.g., a substituted phenol wherein the substituent is an alkyl group of at least 50 carbon atoms); (B) an aldehyde or reactive equivalent thereof (e.g., formaldehyde); (C) a non-amino hydrogen, active hydrogen compound (e.g., a phenol, N,N-dimethyl aniline, etc.) and optionally, (D) an aliphatic alkylating agent of at least 12 carbon atoms (e.g., a polyisobutene of about 50 carbon atoms).

4 Claims, No Drawings

ORGANIC COMPOSITIONS USEFUL AS ADDITIVES FOR FUELS AND LUBRICANTS

REFERENCE TO RELATED APPLICATIONS

This application is a continuation-in-part of U.S. application Ser. No. 661,906, filed Feb. 26, 1976 now abandoned.

BACKGROUND OF THE INVENTION (1) Field of the Invention

This invention relates to compositions especially useful as additives in lubricants based on oils of lubricating viscosity and normally liquid fuels. More particularly, it relates to additive compositions prepared by reacting a hydroxy aromatic compound (or thiol analog thereof) with an aldehyde and an active hydrogen compound containing no amino hydrogens. Optionally, reaction with an alkylating agent of at least 12 carbon atoms can also be included in the sequence of reactions.

This invention also pertains to lubricant, normally liquid fuel and additive concentrate compositions containing these additive compositions. Sulfurized compositions made by sulfurizing the additive compositions of this invention with elemental sulfur are also useful as additives for lubricants and normally liquid fuels and are within the scope of this invention, as are fuel, lubricant and concentrate compositions containing them.

(2) Prior Art

British Pat. No. 1,173,975 discloses pour point depressants made by condensing formaldehyde with an alkylated phenol wherein the alkyl group contains at least 18 carbon atoms.

U.S. Pat. No. 2,440,909 discloses phenolic condensation products made by reacting various phenols with 2,6-dimethylol-4-octyl phenol.

U.S. Pat. No. 3,737,465 discloses condensates of formaldehyde with alkyl-substituted phenols wherein the alkyl group ranges in molecular weight from 400 to about 5000. These condensates are said to be useful as intermediates for reaction with polyamines containing at least two

groups.

The Mannich reaction between active hydrogen compounds, aldehyde such as formaldehyde and compounds containing

groups has been known for some time. It is also known (e.g., from U.S. Pat. Nos. 3,368,972 and 3,649,229) that Mannich condensation products derived from certain alkyl phenols can be useful as dispersants in lubricating oils and fuels.

(3) General Background

The improvement of the performance characteristics of lubricants based on oils of lubricating viscosity (e.g., oils and greases) and normally liquid fuels through the use of additives has been known for several decades. Among the properties that can be improved through the use of additives are (1) the ability of a lubricant or fuel to disperse sludge which accumulates in it during storage or use, (2) the ability of the fuel or lubricant to prevent or inhibit the accumulation of resinous oxidation products (e.g., varnish) and carbon deposits on interior engine parts such as pistons, cylinder walls, cylinder piston rings, etc. and (3) the ability of the lubricant or fuel to inhibit corrosion of metals and other materials with which it comes in contact. In these days of material shortages, spiraling equipment replacement costs, increasing fuel and lubricant costs, and environmental consciousness, the desire to develop new, effective, alternate lubricating and fuel additives has continued unabated.

(4) Objects

Therefore, it is an object of this invention to provide novel compositions of matter that will impart useful and desirable properties to lubricants and normally liquid fuels containing them.

It is a further object of this invention to provide novel concentrates, and lubricants and fuels containing the novel compositions of matter of this invention.

Other objects will be apparent to those skilled in the art upon review of the present specification.

SUMMARY OF THE INVENTION

The objects of this invention are accomplished by providing a novel composition of matter made by reacting:

(A) at least one aromatic compound having (i) one or more XH groups, wherein X is an oxygen or sulfur atom, directly bonded to a carbon atom of an aromatic nucleus and (ii) at least one hydrogen atom bonded directly to a carbon atom of an aromatic nucleus;

(B) at least one aldehyde or reactive equivalent thereof;

(C) at least one non-amino hydrogen, active hydrogen compound; and optionally, (D) at least one hydrocarbon-based aliphatic alkylating agent of at least about twelve carbon atoms; with the provisos that (a) when neither of (A) nor (C) has a hydrocarbon-based aliphatic substituent of at least about twelve carbon atoms, then (A) and (C) are further characterized by having together a total of at least three hydrogen atoms directly bonded to carbon atoms of an aromatic nucleus with at least one such hydrogen atom being in each of (A) and (C), and (D) is a necessary reactant; and (b) when (A) or (C) does contain a hydrocarbon-based aliphatic substituent of at least about twelve carbon atoms, then (A) is not (C).

Novel sulfurized compositions of matter made by sulfurizing the afore-described inventive compositions with elemental sulfur are also within the scope of this invention, as are lubricants based on oils of lubricating viscosity, fuels based on normally liquid fuels and additive concentrates containing either or both of these novel compositions of matter.

DETAILED DESCRIPTION OF THE INVENTION

The Aromatic Compound (A)

The aromatic compound (A) used in making the compositions of this invention has (i) one or more XH groups, wherein X is an oxygen or divalent sulfur atom, directly bonded to a carbon atom of an aromatic nucleus and (ii) at least one aromatic hydrogen atom. Metal salts of (A) can also be used, particularly of the Group IA and IIA metals. Usually these aromatic compounds have one to three XH groups; more typically they have one XH group. Generally X is oxygen and thus the XH group is a hydroxyl group.

The aromatic nucleus can be a single-ring nucleus such as a benzene ring, a pyridine ring, a thiophene ring, etc., or a multi-ring aromatic nucleus. Such multi-ring nuclei can be of the fused type (e.g., naphthalene, anthracene, indolyl, etc.) or they can be of the bridged type, wherein individual aromatic rings are linked through bridging linkages to each other. Such bridging linkages can be chosen from the group consisting of carbon-to-carbon single bonds, ether linkages, sulfide linkages, polysulfide linkages of 2–6 sulfur atoms, sulfinyl linkages, sulfonyl linkages, methylene linkages, lower alkylene linkages, di(lower alkyl)-methylene linkages, lower alkylene ether linkages, lower alkylene sulfide linkages, lower alkylene polysulfide linkages of 2 to 6 sulfur atoms, and mixtures of such bridging linkages.

When linkages are present in the aromatic nuclei, there are usually no more than five such linkages per nucleus; generally, however, the aromatic nuclei of (A) are single ring nuclei or fused ring nuclei of up to four rings.

The aromatic compounds (A) used in making the compositions of this invention have at least one aromatic hydrogen atom (that is, a hydrogen atom bonded directly to a carbon atom of an aromatic nucleus). Usually, there are two or more aromatic hydrogen atoms present. For reasons of cost, availability, and performance, the most typical aromatic nucleus of (A) is a benzene nucleus, although substituted benzenes and substituted naphthalenes are also useful. When substituents are present in the aromatic nucleus of (A) they are selected from the group consisting of lower alkyl, lower alkoxyl, halo, lower alkyl mercapto, cyano and combinations thereof.

Specific examples of single ring aromatic nuclei include the following:

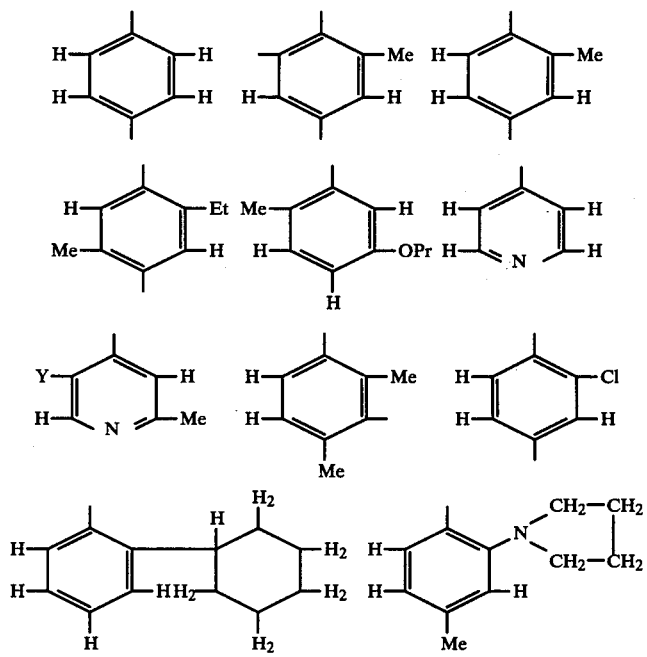

etc.
wherein Me is methyl, Et is ethyl, Pr is n-propyl and Cl is chlorine.

Examples of poly-fused ring aromatic nuclei include the following:

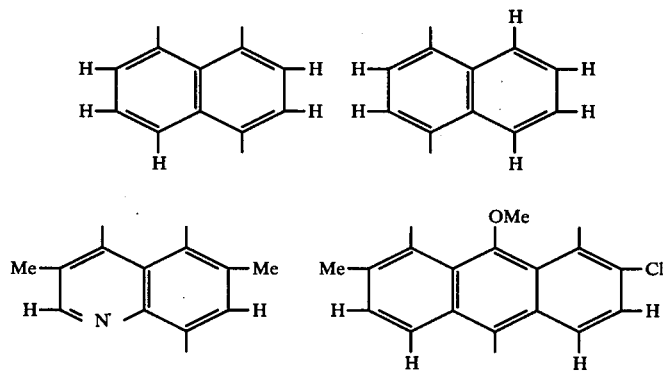

-continued

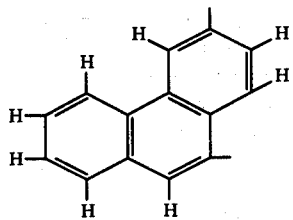 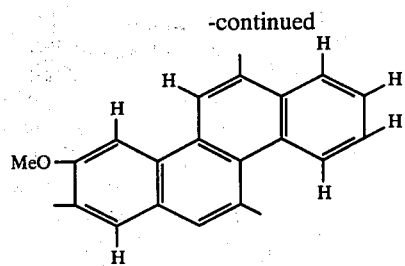

etc.

Specific examples of linked poly-ring aromatic nuclei include the following:

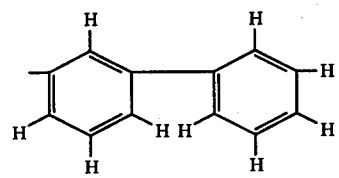 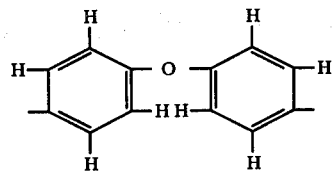

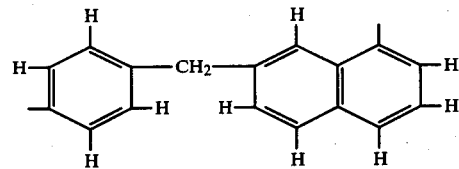

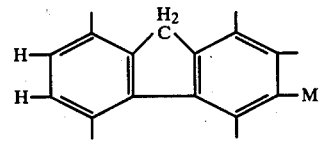

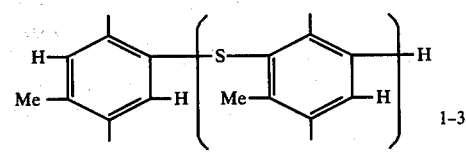

1-3

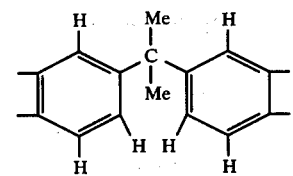

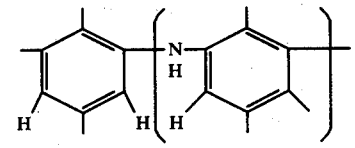

1-4, etc.

In certain embodiments of this invention, the aromatic compound (A) does not have at least one hydrocarbon-based substituent of at least twelve carbon atoms. When this is so, (D) (which is discussed in greater detail hereinbelow) is a necessary reactant to make the compositions of this invention, and the total number of aromatic hydrogen atoms in reactants (A) and (C) is at least three, more preferably, at least five. Specific examples of aromatic compounds (A) not having a hydrocarbon-based substituent of at least 12 carbon atoms include phenol, substituted phenols wherein the substituents are chosen from the group consisting of lower alkyl, lower alkoxyl, halo, lower alkyl mercapto, cyano and combinations thereof, resorcinol, o- and/or p-hydroquinones, the various naphthanols, anthracenols and substituted analogs thereof wherein the substituents are chosen from the group consisting of lower alkyl, lower alkoxyl, halo, lower alkyl mercapto, cyano and combinations thereof. In this specification and the appended claims, "lower" refers to groups having less than eight carbon atoms.

In other embodiments of this invention, the aromatic compound (A) has a hydrocarbon-based aliphatic substituent of at least 12 carbon atoms. Often this substituent has at least about 30 carbon atoms. In such embodiments, (D) is an optional reactant. The nature of this substituent is generally the same as that of the reagent (D) which is discussed hereinbelow, and usually the substituent is derived from such a reagent as described hereinbelow.

Usually, this substituent is purely aliphatic and contains no more than one carbon-to-carbon double bond (that is, an ethylenic linkage

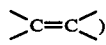

per every ten carbon-to-carbon single bonds. The substituent is preferably free from acetylenic unsaturation (that is, —C≡C—). Often it has at least about thirty carbon atoms. Typically, the substituent has an average of no less than about 50 carbon atoms and an average of no more than about 10,000 carbon atoms. Usually, it has an average of no more than 300 carbon atoms.

A preferred type of aromatic compound (A) having a substituent of at least 12 carbon atoms is a mono-substituted phenol of the general formula:

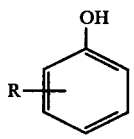

Formula 1 wherein R is a hydrocarbon-based aliphatic substituent of about 30 to about 5,000 carbon atoms. Usually R in Formula 1 is derived from a homo- or interpolymer of mono-olefins having from 2 to about 20 carbon atoms and is in a position para to the —OH group. Specific examples of the substituent R are a polypropylene group of about 60 to 340 carbons, a poly(ethylene/propylene) group of about 110 to about 260 carbons (equimolar monomer ratio), a poly(isobutene) group of about 70 to about 320 carbon atoms, and a poly(1-hexene/1-octene/1-decene) group of about 400 to about 750 carbons (equimolar monomer ratios).

A preferred source of the group R are polybutenes, especially poly(isobutene)s, obtained by polymerization of a $C_4$ refinery stream having a total butene content of 20 to 75 weight percent and, more specifically, isobutene content of 15 to 60 weight percent in the presence of a Lewis acid catalyst such as aluminum trichloride or boron trifluoride. The balance of the stream can contain materials such as ethylene, propylene, butadiene and the saturated analogs as well as other materials typically found in $C_4$ refinery streams. These polybutenes contain predominantly (greater than 80% of total repeat units) isobutene repeating units of the configuration

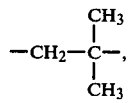

The attachment of the hydrocarbyl group R to the aromatic ring of compound (A) can be accomplished by a number of techniques well known to those skilled in the art. A number of these are discussed herein below. Suffice it to say at this point that one particularly suitable technique is the Friedel-Crafts reaction, wherein an olefin (e.g., a polymer containing an olefinic bond), or halogenated or hydrohalogenated analog thereof, is reacted with a phenol. The reaction occurs in the presence of a Lewis acid catalyst (e.g., boron trifluoride and its complexes with ethers, phenols, hydrogen fluoride, etc., aluminum chloride, aluminum bromide, and zinc dichloride). Methods and conditions for carrying out such reactions are well known to those skilled in the art. See, for example, the discussion in the article entitled, "Alkylation of Phenols" in "Kirk-Othmer Encyclopedia of Chemical Technology," Second Edition, Vol. 1, pages 894-895, Interscience Publishers, a division of John Wiley and Company, N.Y., 1963.

When the aromatic compound (A) has at least one hydrocarbon-based substituent of at least 12 carbon atoms, the reagent (D) may or may not be used to produce the compositions of this invention. Often, the reagent (D) is not used in these embodiments. Since the typical hydrocarbon-based substituents incorporated in the aromatic compound (A) having at least 12 aliphatic carbon atoms are derived from the hereinafter described reagent (D), all the preferences expressed during the discussion of (D) apply equally to the hydrocarbon-based substituents of (A) having at least 12 aliphatic carbon atoms.

Mixtures of two or more of the above-described aromatic compounds can be used as the aromatic compound (A) reagent.

The Aldehyde or Reactive Equivalent Thereof (B)

The aldehyde (B) is generally a mono- or dialdehyde of 1 to 30 carbon atoms; usually (B) is a lower hydrocarbon-based aldehyde such as glyoxal, acetaldehyde, propanal, butanal, glutaric aldehyde, etc., having up to 7 carbon atoms. Because of cost, availability and reactivity, the aldehyde (B) is preferably a mono-aldehyde and most preferably, it is formaldehyde or reactive equivalent thereof.

Exemplary of such lower aldehydes are formaldehyde, acetaldehyde, the butyraldehydes, hydroxybutyraldehydes (e.g., those formed by condensation of two moles of acetaldehyde), the pentanals, hexanals and heptanals. Other suitable aldehydes are carbocyclic aldehydes such as benzaldehyde, furfural, phenyl acetaldehyde, cyclohexane carboxaldehyde, fural, etc. Substituted aldehydes such as orthohydroxybenzaldehydes, salicylaldehyde, chloral, chloroacetaldehyde and hydroxy acetaldehyde can also be used as can be methoxy and nitro analogs thereof. Mixtures of the above-mentioned aldehydes can also be used as reagent (B) in the formation of the compositions of this invention.

The aldehyde (B) or a portion thereof can be replaced by a reactive equivalent thereof. Reactive equivalents are materials which generate aldehydes under the conditions of the reaction to which the equivalent is subjected. Typical reactive equivalents of the aldehyde are polymers such as cyclic oligomers and linear high polymer of the aldehyde (e.g., trioxane and paraformaldehyde are reactive equivalents of formaldehyde) or solutions of aldehydes in solvents such as water and lower alkanols. Acetals such as methal can also be considered reactive equivalents of formaldehyde.

The Non-amino Hydrogen, Active Hydrogen Compound (C)

The non-amino hydrogen, active hydrogen compound (C) is an organic compound which does not contain any >NH groups. These compounds can, however, contain $NZ_2$ groups, wherein each Z is a hydrocarbon-based radical; in other words, tertiary amine-containing compounds are considered non-amino hydrogen compounds.

These active hydrogen compounds are compounds capable of forming Mannich bases as defined in "Advanced Organic Chemistry: Reactions, Mechanism and Structure" by Jerry March, published by McGraw-Hill Book Company, 1968, N.Y. on pages 670–672, or they are aromatic compounds bearing at least one electron-donating substituent having a negative sigma (para) value as defined by the Hammett function set forth in "Physical Organic Chemistry," Second Edition, L. P. Hammett, McGraw-Hill Book Company, N.Y., 1970. These references are hereby incorporated by reference for their disclosures of parameters which define the active hydrogen compounds (C). Regardless of type, the active hydrogen compounds (C) all contain at least one hydrogen atom which is capable of reacting with the hydrocarbon-based aldehyde (B).

When the aromatic compound (A) or the active hydrogen compound (C) contains a hydrocarbon-based aliphatic substituent of about 12 carbon atoms, the active hydrogen compound (C) is not the same as the aromatic compound (A), although there may be a generic relationship between the two. Thus, for example, when the aromatic compound (A) is of the formula

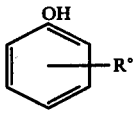

Formula 2 wherein R° is a hydrocarbon-based aliphatic group of 30 to 200 carbon atoms, the active hydrogen compound (C) can be of the formula

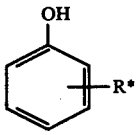

Formula 3 wherein R* is of 50 to 100 carbon atoms and R° is not the same as R*. For example, R° could contain an average of 35 carbon atoms while R* contains an average of 70 carbon atoms. Alternatively, both R° and R* could both contain an average of 70 carbon atoms, but R° could be derived from poly(hexene-1) while R* is derived from poly(isobutene).

Examples of the types of compounds which can serve as the active compound (C) in reactions forming the compositions of this invention are the following:

(a) phenols including those with at least one R' substituent such as phenol; resorcinol; o- and p-hydroquinone (and the $C_{1-30}$ hydrocarbon-substituted analogs thereof); anisole; pyrogallol; catechol; the various xylenols; o-, m- and p-cyanophenols; o-, m- and p-chloro and bromo phenols; the biphenyldiols and -triols, the pyridinols, 4,4'-isopropylidenebisphenols, etc.;

(b) naphthols including those with at least one R' substituent such as 2-, 3- and 4-naphthol; the azanaphthalenols, -diols and -triols and chloro-, bromo-, and cyano-substituted analogs thereof;

(c) ethers of the formula (R')$_2$CHOR'' such as dimethyl, diethyl-, dipropyl-, di(isobutyl)-, etc., ethers; benzyl alkyl ethers; dibenzyl ethers; alkyl phenyl and alkyl naphthyl ethers, etc.;

(d) ketones of the formula (R')$_2$CHC(O)R'' such as acetone, methyl ethyl ketone, methyl isobutyl ketone, cyclohexanone, acetophenone and analogous $C_{3-30}$ alkyloyl benzenes and naphthalenes, etc.;

(e) diones of the formula (R')$_2$CHC(O)CR'$_2$C(O)R'' such as 2,4-pentanedione, 3,5-hexanedione; 2,4-, 3,5-, 4,6-decanediones, etc.;

(f) alcohols of the formula

YOH such as the $C_{6-30}$ alkanols and alkenols as well as the phenyl- and naphthyl-substituted analogs thereof (e.g., 1-hexanol, benzyl alcohol, n-dec-2-en-6-ol, etc.);

(g) carboxylic acids of the formula (R')$_2$CHC(O)OH and thiol analogs thereof, such as the saturated and unsaturated $C_{1-30}$ fatty acids and their phenyl-, naphthyl-, xylyl-, and tolyl-substituted analogs thereof (e.g., acetic, butyric, myristic, oleic, stearic, linoleic, phenyl acetic acids, etc.);

(h) carboxylate esters of the formula (R')$_2$CHC(O)OR'' and thiones and thiol analogs thereof, such as alkyl, alkenyl, phenyl, naphthyl, alkyl-substituted phenyl and -naphthyl esters of the acids mentioned under (g) above (e.g., n-octyl acetate, hexadecenyl butyrate, methyl phenyl acetate, etc.);

(i) nitriles of the formula (R')$_2$CHCN such as the $C_{1-30}$ alkyl, alkenyl, phenyl- and naphthyl-substituted alkyl and alkenyl nitriles (e.g., acetonitrile, ethyl nitrile, cinnamic nitrile, phenyl acetonitrile, etc.);

(j) substituted heterocyclic compounds of the formula heterocycle—CH(R')$_2$ such as the $C_{1-30}$ alkyl and alkenyl-substituted thiophenes, pyrroles, furans, pyridines, pyrans, dioxanes, N-$C_{1-30}$ alkyl and alkenyl pyrroles and imidazoles; quinolines, etc.);

(k) tertiary aromatic amines of the formula (R$^\#$)$_3$N such as di-($C_{1-30}$ alkyl and alkenyl)phenyl and naphthyl amines, etc. (e.g., N,N-dimethylnaphthylamine, triphenylamine, N,N-dimethyl aniline, etc.);

(l) tertiary aromatic polyamines of the formula

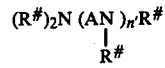

such as the N-peralkylated polyalkylene polyamines and phenylene diamines (e.g., N,N',N'-trimethyl-N-phenyl ethylene diamine, N,N'-tetra-ethyl-p-phenylene diamines, etc.);

(m) glycols and polyglycol ethers of the formula

R'O (AO)$_{n'}$R' such as the C$_{2-30}$ alkylene and polyalkylene glycols and polyglycols (e.g., ethylene glycol, di(propylene)glycol, trimethylene glycol; 2,7-decane diol, penta(oxyethylene)glycol, deca(oxypropylene)glycol, etc.);

(n) hydroxy hydrocarbyl tertiary amines of the formula

R'''(OH)$_{p'}$(NR'')$_{q'}$ such as the tertiary alkanol and alkenol amines and their aromatic analogs (e.g., N,N-di(C$_{1-30}$ alkyl)ethanol amines; N,N-di-(C$_{1-30}$ hydroxy alkyl)phenyl amines, etc.); and (o) polyols of the formula R'''(OH)$_{m'}$ such as the C$_{5-30}$ poly(methylol)alkanes (e.g., pentaerythritol, trimethylolethane and trimethylolpropane, etc.), glycerol, erythritol, sorbitol, mannitol, etc.; wherein each R' is independently hydrogen or R''; each R'' is independently a C$_1$ to C$_{30}$ hydrocarbon-based substituent, R$^{\#}$ is R'' with the proviso that at least one R'' per molecule is a C$_6$ to C$_{18}$ aromatic substituent (preferably purely hydrocarbyl in nature); A is a divalent hydrocarbon-based group of 2 to 30 carbon atoms and especially alkylene of two to six carbon atoms, n' is an integer of 1 to 10; m' is an integer of 3 to 6; R''' is a polyvalent C$_{3-30}$ hydrocarbon-based non-aromatic group (e.g., aliphatic or alicyclic) having m' valences; p' and q are each 1, 2 or 3, their sum being m'; and Y is an alkyl or alkenyl group of about 6-30 carbon atoms. Where structurally possible, 2R', 2R'', or an R' and an R'' group(s) can together form a carbocyclic ring on 4 to 7 ring carbon atoms. Thio and thiol analogs (wherein one or more oxygen atoms in the above formulae are replaced by sulfur atoms) of the above-described active hydrogen compounds can also be used as reactant (C) as can mixtures of such active hydrogen compounds including mixtures of oxygen and sulfur analogs.

When (A) has a hydrocarbon-based substituent of at least 12 carbon atoms and (D) is not a reactant, the preferred active hydrogen compound (C) are phenols (including benzene diols such as resorcinol and the hydroquinones), naphthols, tertiary aromatic amines, carboxylic acids or thiol analogs of said phenols, naphthols or acids.

When the alkylating reagent (D) is a necessary reactant, the preferred active hydrogen compounds (C) are phenols, naphthols, and tertiary aromatic amines.

The Hydrocarbon-based Alkylating Agent (D)

The hydrocarbon-based aliphatic alkylating agent (D) has at least 12 carbon atoms. Generally, (D) has an average of about 30 to about 10,000 carbon atoms. Often (D) has no less than an average of about 50 carbon atoms and no more than an average of about 300 carbon atoms.

As used herein, the term "hydrocarbon-based" denotes a substituent or agent which, respectively, has a carbon atom directly attached to the remainder of the molecule and has predominantly hydrocarbyl character within the context of this invention or which is an agent capable of introducing such a hydrocarbon-based substituent into a molecule. Examples of such substituents include the following:

(1) Aliphatic (e.g., alkyl or alkenyl) substituents.

(2) Substituted hydrocarbon substituents, that is, those containing non-hydrocarbon radicals which, in the context of this invention, do not alter the predominantly hydrocarbyl character of the substituent. Those skilled in the art will be aware of suitable radicals (e.g., hydroxy, halo (especially chloro and fluoro), alkoxyl, mercapto, alkyl mercapto, sulfoxy, etc., radicals).

(3) Hetero substituents, that is, substituents which, while predominantly hydrocarbon in character within the context of this invention, contain atoms other than carbon present in a chain otherwise composed of carbon atoms. Suitable hetero atoms will be apparent to those skilled in the art and include, for example, sulfur, oxygen and nitrogen and form substituents such as, e.g., aza, oxa and thia substituents.

In general, no more than about three non-hydrocarbon radicals or hetero atoms, and usually no more than one, will be present for each 10 carbon atoms in the hydrocarbon-based substituent. Usually no non-hydrocarbon or hetero atoms are present and the hydrocarbon substituent is purely hydrocarbyl.

Generally, the hydrocarbon-based substituents in the compositions of this invention are free from acetylenic unsaturation. Ethylenic unsaturation, when present, preferably will be such that no more than one ethylenic linkage will be present for every 10 carbon-to-carbon bonds in the substituents.

The alkylating agent (D) is aliphatic in character. This means it contains no more than one non-aliphatic (e.g., carbocyclic group) for every 15 aliphatic carbon atoms. Generally (D) is purely aliphatic in nature and contains no carbocyclic groups or heterocyclic groups.

The alkylating agents (D) used to make the compositions of this invention, can be either olefins or halides derived from said olefins by the addition of a hydrohalide or halogen such as bromine or chlorine. Such halides can also be obtained by halogenation of appropriate saturated or unsaturated hydrocarbons (e.g., by free radical halogenation). Useful olefins are, for the most part, high molecular weight substantially saturated petroleum fractions (e.g., cracked waxes) or substantially saturated olefin oligomers and polymers, particularly oligomers and polymers of mono-olefins having from 2 to about 30 carbon atoms. Exemplary of polymers useful as the alkylating agent (D) are the homopolymers of 1-mono-olefins having 2 to about 20 carbon atoms such as ethylene, propene, 1-butene, isobutene, 1-hexene, 1-octene, 2-methyl-1-heptene, 3-cyclohexyl-1-butene, 2-methyl-5-propyl-1-hexene, 1-dodecene, 1-tetradecene, 1-octadecene, 1-cosene, 1-tetracosene, etc.

Homopolymers of medial olefins, i.e., olefins in which the olefinic linkage is not at the terminal position, likewise are useful. They are illustrated by 2-butene, 3-pentene, and 4-octene. Mixtures of these homopolymers such as a mixture of poly(propene) and poly(1-decene) can also serve as the alkylating agent (D).

Also useful are the interpolymers of olefins, such as those mentioned above, with other interpolymerizable olefinic substances such as aromatic olefins, cyclic olefins, and polyolefins. Such interpolymers include, for example, those prepared by polymerizing isobutene with styrene; isobutene with butadiene; propene with isoprene; ethylene with piperylene; isobutene with 1-tetradecene; isobutene with p-methyl styrene; 1-hexene with 1,3-hexadiene; 1-octene with 1-hexene; 1-heptene with 1-pentene; 3-methyl-1-butene with 1-octene; 3-3-dimethyl-1-pentene with 1-hexene; isobutene with styrene and piperylene; etc.

Mixtures of such interpolymers as well as mixtures of one or more interpolymer with one or more homopolymer can also serve as the alkylating agent (D).

Specific examples of such interpolymers include copolymer of 95% (by weight) of isobutene with 5% of styrene; terpolymer of 98% of isobutene with 1% of piperylene and 1% of chloroprene; terpolymer of 95% of isobutene with 2% of 1-butene and 3% of 1-hexene; terpolymer of 60% of isobutene with 20% of 1-pentene and 20% of 1-octene; copolymer of 80% of 1-hexene and 20% of 1-heptene; terpolymer of 90% of isobutene with 2% of cyclohexene and 8% of propene; and copolymer of 80% of ethylene and 20% of propene.

Typical of the alkylating agents (D) are the homo- and interpolymers of the various butenes (i.e., isobutene, 1- and 2-butene) and mixtures thereof. Particularly preferred sources are the butene polymers described hereinabove wherein isobutene units

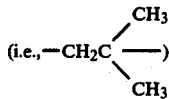

predominate, preferably to the extent of about 80% of the molecule's units. These butene polymers usually yield polybutenyl substituents.

For the lower molecular weight alkylating agent (D) (e.g., those of less than about 50 carbon atoms), pure olefins and mixtures of such pure olefins (or their halogenated or hydrohalogenated analogs) can be used. Exemplary of such alkylating agents are 1-octadecene, 1-tetracontene, 1-contene, 2-dodecene, etc.

Further specific examples of (D) are the following: tetra(propylene), tri(isobutene), 3-hexacontene, 1-henpentacontene, a mixture of poly(ethylene/propylene) polymers having about 35 to about 70 carbon atoms, a mixture of the oxidatively or mechanically degraded poly(ethylene/propylene) polymers having about 35 to about 70 carbon atoms, a mixture of poly(propylene/1-hexene) polymers of about 80 to about 150 carbon atoms, a mixture of poly(isobutene) polymers having between 20 and 32 carbon atoms and a mixture of polyisobutene polymers having an average of 50 to 75 carbon atoms.

As noted above, when (A) or (C) has a hydrocarbon-based substituent of at least twelve carbon atoms, that substituent is essentially aliphatic and, in general, is the same as the substituent that is introduced by the alkylating agent (D). Therefore, it will be obvious to those skilled in the art that the above description of (D), with all the included limitations, exemplifications and preferences applies equally to the hydrocarbon-based substituent present in (A) and/or (C) in many embodiments of this invention.

The alkylating agent (D) can be reacted with (A) or (C) or the product of (A), (B) and (C) where (A) and/or (C) has a hydrocarbon-based substituent of at least about 12 carbon atoms and where neither of them do. In the latter case, (D) is a necessary reactant, while in the former case, it is an optional reactant. When reagent (A) or (C) has a hydrocarbon-based substituent of at least 12 carbon atoms, it is preferred that (D) not be a reactant.

Preferably, the alkylating agent (D) is reacted with the aromatic compound (A) or the active hydrogen compound (C) before these reagents are reacted with the other reagents used to make the compositions of this invention. However, as noted above, it is possible that the alkylating agent (D) can be reacted with the product obtained from reaction of (A) with (B) and (C).

The reaction of the alkylating agent (D) with the other reagents used to make the compositions of this invention, typically take place under Freidel-Crafts conditions, in the presence of a Freidel-Crafts catalyst, such as boron trifluoride and its complexes with ether, phenol, hydrogen fluoride, etc. Other Freidel-Crafts catalysts such as aluminum chloride, aluminum bromide, etc. can also be used. The method and conditions for carrying out such reactions are well known in the art. See for example, description of such reactions with aromatic compounds in the article entitled "Alkylation of Phenols" in Kirk-Othmer "Encyclopedia of Chemical Technology," Second Edition, Vol. 1, pages 894–895, Interscience Publishers, a division of John Wiley and Company, 1963. Other equally appropriate and convenient techniques for the reaction of the alkylating agent (D), with the other components used to make the compositions of this invention will occur readily to those skilled in the art.

The sequence in which the various reactants (A), (B), (C) and (D) can be reacted to form the compositions of this invention is not critical. Therefore, various sequences can be used. For example, (A) can be reacted with (D) then with (B) and finally with (C). Alternatively, (A) can be reacted with (D) and then the intermediate (A)/(D) product thereby obtained reacted with both (B) and (C) simultaneously. In another variation, (A) can be reacted with (B) and the intermediate (A)/(B) product thereby obtained then reacted with (C), and finally the (A)/(B)/(C) product reacted with (D). When (D) is not a reactant (A) can first be reacted with (B) and then the (A)/(B) intermediate reacted with (C). Alternatively (A), (B) and (C) can be reacted simultaneously.

In another embodiment of this invention, (A), (B) and (C) can be simultaneously reacted and optionally the product thereby obtained then reacted with (D). The sequence of reactions is only limited by the fact that (A) cannot be reacted with (C) without being first reacted with (B) or the reaction being carried out simultaneously with (B), and further, that (D) is never directly reacted with (B). Thus, (A) can be reacted with (B), then (C) can be reacted with (D) and finally the products (A)/(B) and (C)/(D) of each reaction reacted with each other to provide the compositions of this invention.

The ratio of reactants (A), (B), (C) and (D) generally falls in the molar ratio of (A):(B):(C):(D) of 1:1–5:1–5:0-.0–5. Usually the ratio of (A):(B):(C):(D) is 1:1–5:1–5:0-.5–5. When (B) is a reactive equivalent of an aldehyde, its molecular weight is considered to be the amount of aldehyde that it will produce under the conditions of the reaction. Thus, trioxane's molecular weight is considered to be one-third of its actual molecular weight. The molecular weights of (A), (B) and (C) are their conventional molecular weights. Where they contain a mixture of polymeric substituents, their number average molecular weight is used. Generally, the reactants are reacted in the molar ratio of (A):(B):(C):(D) of 1:1-3:-1-3:0-3; usually 1:1-3:1-3:1-3.

Generally, the reaction of (A) or (A) derived intermediate (e.g., an (A)/(D) intermediate) with (B) takes place in the temperature range of about 30° to about 150° C., preferably, about 80° to about 100° C. Similarly, the reaction of (C) with the other reagents made to make the compositions of this invention or intermediates derived from them takes place in the range of about 80° to about 220° C., preferably about 100° to about 190° C. The reaction of (C) is generally accompanied by the production of water which is drawn from the reaction mixture, thus driving the reaction to completion. This can be accomplished by conventional techniques such as azeotropic distillation, vacuum distillation and so forth.

The times for the reaction of each reagent with each other and the intermediates formed thereby generally takes place in a period of time which is not critical and ranges from about 0.25 to about 48 hours, usually from about 1-8 hours for each step. As is apparent, all that is necessary is that each step of the reaction in the sequence of reaction steps is carried out for a period of time sufficient to obtain reaction between the reactants present in order to form the desired reaction product or intermediate. It will be obvious to those skilled in the art that intermediate products (e.g., (A)/(B), (C)/(D), (A)/(C), (A)/(D), etc.) can be stored for prolonged periods (for example, days, weeks and months) before being further reacted.

A substantially inert, normally liquid organic solvent/diluent is often used in these reactions to increase their rate but its use is not absolutely necessary. Often excesses of one or more reactants can be used for this purpose. Useful organic solvent/diluents include lower alkanols, such as butyl and amyl alcohols; aromatic hydrocarbons such as benzene, toluene, xylene; aliphatic hydrocarbons such as decane, dodecane; kerosene; mineral oil; etc. and mixtures of two or more of any such conventional solvent/diluents. As will be apparent, a "substantially inert" solvent/diluent is one which does not react with the reactants or products in any significant amount and, preferably, not at all.

The reaction of aldehyde (B) with (A) and/or (C) is usually catalyzed by a base or an acid; preferably, the (A)/(B) is catalyzed with a base such as an alkali metal or alkaline earth metal oxide, hydroxide or alkoxide such as sodium hydroxide, and calcium oxide, potassium hydroxide, calcium hydroxide, barium methylate, barium ethoxide, etc. Other suitable basic catalyst include tetramethyl ammonium hydroxide, ammonium hydroxide, etc. Up to one mole of catalyst for each mole of aldehyde (B) present can be used, normally about 0.05-0.5 mole of catalyst per mole of (B) is used. It is usually preferable to neutralize the basic catalyst with a low molecular weight organic or inorganic acid before proceeding further. However, such neutralization is not necessary. Useful acids for accomplishing such neutralizations (or catalyzing an (A)/(B) reaction with (C)) include the lower alkanoic acids, such as formic acid and acetic acid, and inorganic acids such as sulfuric, hydrochloric, phosphoric, nitric acid and the like.

It is believed that the compositions of this invention contain bridges derived from the organic residue of the aldehyde (B) linking the organic residues of the aromatic compound (A) and the active hydrogen compound (C). This belief is supported by the available data. Thus, when (B) is formaldehyde, methylene bridges are formed. The invention, however, is in no way intended to be limited by reference to such bridges.

The following are specific illustrative examples of how to make and use the aforesaid invention and include the best mode of the invention presently known. In these examples, as well as in this specification and the appended claims, all percentages and parts are by weight (pbw), unless otherwise expressly stated to the contrary, and the molecular weights are number average molecular weights as determined by vapor pressure osmometry (VPO).

Examples 1 to 13 are carried out according to the following general procedure: A mixture of the polybutenyl-substituted phenol, mineral oil, n-butanol, sodium hydroxide and paraformaldehyde is heated at 82°-87° C. for three hours. Glacial acetic acid is then added to neutralize the hydroxide catalyst. Distillate is removed as the mixture is heated to 125° C. under nitrogen. The active hydrogen compound is added and the mixture heated at 175°-185° C. for three hours. The reaction product is then stripped at 190°-200° C. under vacuum and filtered to yield an oil solution of the desired product containing about 40% wt. of mineral oil.

Examples 14 to 18 are carried out by the same procedure with the exception that the active hydrogen compound is added immediately after the glacial acetic acid addition.

TABLE I

| Example Number | Polybutenyl Phenol $\overline{M}n^*$ | Polybutenyl Phenol pbw | $(CH_2O)_x$ pbw | NaOH equiv. | Solvent n-butanol pbw | Solvent oil pbw | Acetic Acid equiv. | Active Hydrogen Compd. | pbw |
|---|---|---|---|---|---|---|---|---|---|
| 1 | a | 4000 | 165 | 0.25 | 165 | 2863 | 0.25 | phenol | 250 |
| 2 | b | 960 | 39.6 | 0.06 | 40 | 701 | 0.06 | o-chlorophenol | 77.2 |
| 3 | c | 1800 | 99 | 0.15 | 99 | 1318 | 0.15 | phenol | 150 |
| 4 | a | 960 | 39.6 | 0.06 | 40 | 693 | 0.06 | anisole | 64.8 |
| 5 | b | 960 | 36 | 0.06 | 36 | 709 | 0.06 | α-naphthol | 87 |
| 6 | a | 1120 | 46 | 0.07 | 46 | 809 | 0.07 | p-cresol | 73 |
| 7 | a | 960 | 33 | 0.06 | 40 | 698 | 0.06 | N,N-dimethyl aniline | 72.6 |
| 8 | b | 1120 | 46 | 0.07 | 46 | 828 | 0.07 | o-t-butyl phenol | 105 |
| 9 | b | 715 | 33 | 0.05 | 33 | 519 | 0.05 | o-cresol | 52 |
| 10 | a | 4160 | 172 | 0.26 | 172 | 3005 | 0.26 | catechol | 286 |
| 11 | b | 1120 | 46 | 0.07 | 46 | 845 | 0.07 | bisphenol A** | 106.5 |
| 12 | a | 960 | 39.6 | 0.06 | 40 | 699 | 0.06 | Pyrogallol | 75.6 |
| 13 | b | 800 | 33 | 0.05 | 33 | 578 | 0.05 | Hydroquinone | 55 |
| 14 | a | 1360 | 56 | 0.085 | 56 | 976 | 0.085 | Mercapto acetic acid | 78 |
| 15 | b | 1040 | 43 | 0.065 | 43 | 762 | 0.065 | Thiophenol | 82 |
| 16 | d | 664 | 165 | 0.35 | 165 | 851 | 0.35 | Thiophenol | 550 |

TABLE I-continued

| Example Number | Polybutenyl Phenol $\overline{M}n$* | pbw | $(CH_2O)_x$ pbw | NaOH equiv. | Solvent n-butanol pbw | oil pbw | Acetic Acid equiv. | Active Hydrogen Compd. | pbw |
|---|---|---|---|---|---|---|---|---|---|
| 17 | a | 1760 | 72.6 | 0.11 | 73 | 1271 | 0.11 | Resorcinol | 121 |

*$\overline{M}n$ of phenol by VPO; a = 1300; b = 1340; c = 920; and d = 266;
**4,4'-isopropylidenebisbenzenol

EXAMPLE 18

A mixture of 960 parts of a polybutenyl-substitued phenol ($\overline{M}n$(VPO)=1340), 687 parts of mineral oil, 40 parts n-butanol, 60 parts of phenol, 5.3 parts of a 50% aqueous solution of sodium hydroxide and 50 parts of paraformaldehyde is heated at 175° C. under nitrogen for 6 hours as water is removed by azeotropic distillation. Glacial acetic acid (41 parts) is added to the reaction mixture and the mixture is then stripped to 200° C. under vacuum and filtered to yield a 60% solution of the desired product in mineral oil.

EXAMPLE 19

A mixture of 1600 parts of a polybutenyl-substituted phenol ($\overline{M}n$(VPO)=1300), 300 parts of xylene, 25 parts of concentrated hydrochloric acid solution and 33 parts of paraformaldehyde is heated at 85°-90° C. for 4 hours. The mixture is stripped to 180° C. under vacuum. Phenol (150 parts) is then added and the mixture is heated to 220° C. in 16 hours. The mixture is stripped at 220° C. under vacuum and 710 parts of mineral oil is added to the residue. Filtration yields the desired product (69.5% solution in mineral oil).

EXAMPLE 20

A mixture of 1120 parts of a polybutenyl-substituted phenol ($\overline{M}n$=1340), 498 parts of mineral oil, 46 parts of n-butanol, 5.6 parts of a 50% aqueous solution of sodium hydroxide and 46.2 parts of paraformaldehyde is heated at 80°-90° C. for 3 hours. Glacial acetic acid (4.2 parts) is then added and the mixture is heated at 110°-115° C. for 0.5 hour. The reaction mixture is stripped to 126° C. under vacuum to yield the desired intermediate.

A mixture of 240 parts of mineral oil and 221 parts of phenol is heated to 166° C. At 166°-185° C. 1310 parts of the polybutenylphenol-formaldehyde intermediate prepared above is added to the mixture over a period of 5 hours and this mixture held at 180° C. for 1 hour. The reaction mixture is stripped at 190° C. under vacuum to yield 1421 parts of the desired polybutenyl-substituted phenol/formaldehyde/phenol product (60% solution in mineral oil).

EXAMPLE 21

A mixture of 1064 parts of a tetrapropenyl phenol, 844 parts of mineral oil, 264 parts of n-butanol, 32 parts of a 50% aqueous solution sodium hydroxide and 264 parts of paraformaldehyde is heated at 85° C. for 3 hours. Glacial acetic acid (24 parts) followed by 665 parts of a tetrapropenyl phenol is added and the mixture is stripped to 122° C. At 85° C., 150 parts of phenol is added and then heated to 169° C. in 6 hours, as water is removed continuously. Mineral oil (470 parts) is added and reaction mixture is stripped to 196° C. under vacuum. The reaction mixture is filtered at 145° C. to yield the desired product (60% solution in mineral oil).

EXAMPLE 22

A mixture of 1 mole of poly(isobutene)-substituted phenol (substituent $\overline{M}n$=1600 by VPO) and 3 moles of formaldehyde are reacted in mineral oil diluent (47.5%) at 30° C. to form the desired intermediate. Then to 746 parts of this intermediate oil solution and 300 parts of benzene is added 27 parts of pentaerythritol. The mixture is heated at 90° to 150° C. for 1.75 hours and at 150° to 215° C. for an additional 1.25 hours. The mixture is held at 215°-220° C. for 6 hours and filtered to provide an oil solution of the desired product.

The compositions of this invention can be further modified by sulfurization with elemental sulfur. This is accomplished by reacting the composition with elemental sulfur at a temperature ranging from the melting point of the sulfur being used up to about 300° C. to produce a product having about 0.1 to about 20% sulfur by weight. The ratio by weight of compositions to sulfur used in these sulfurizations is usually about 1:0.1-1. These sulfurized products improve the oxidation and thermal stability of fuels and lubricants containing them as well as imparting sludge-dispersing and detergent properties to the fuel or lubricant.

EXAMPLES 23, 24 AND 25

The products of examples 1, 7 and 13 are sulfurized by the same general procedure. The oil solutions of each product as obtained (500 parts) are mixed with flowers of sulfur (64 parts) and the resultant mixture heated at 185° C. for 13 hours. Provision is made for collecting the hydrogen sulfide generated by venting the reaction vessel to a caustic trap. The reaction mixture is then filtered through diatomaceous earth to provide, as a filtrate, an oil solution of the desired sulfurized product.

As previously indicated, the compositions of this invention are useful as additives for lubricants, in which they function primarily as sludge dispersants and detergents. Such dispersants and detergents disperse and remove from surfaces sludge which forms in the lubricant during use. They can be employed in a variety of lubricants based on diverse oils of lubricating viscosity, including natural and synthetic lubricating oils and mixtures thereof as well as greases derived therefrom. These lubricants include crankcase lubricating oils for spark-ignited and compression-ignited internal combustion engines, such as automobile and truck engines, two-cycle engines, marine and railroad diesel engines, and the like. They can also be used in gas engines, stationary power engines and turbines and the like. Automatic transmission fluids, transaxle lubricants, gear lubricants, metal-working lubricants, hydraulic fluids and other lubricating oil and grease compositions can also benefit from the incorporation therein of the compositions of the present invention.

Natural oils include animal oils and vegetable oils (e.g., castor oil, lard oil) as well as mineral lubricating oils such as liquid petroleum oils and solvent-treated or acid-treated mineral lubricating oils of the paraffinic, naphthenic or mixed paraffinic-naphthenic types. Oils of lubricating viscosity derived from coal or shale are also useful base oils. Synthetic lubricating oils include hydrocarbon oils and halosubstituted hydrocarbon oils such as polymerized and interpolymerized olefins (e.g., polybutylenes, polypropylenes, propylene-isobutylene copolymers, chlorinated polybutylenes, etc.); poly(1-hexenes), poly(1-octenes), poly(1-decenes), etc. and mixtures thereof; alkylbenzenes (e.g., dodecylbenzenes, tetradecylbenzenes, dinonylbenzenes, di-(2-ethylhexyl)-benzenes, etc.); polyphenyls (e.g., biphenyls, terphenyls, alkylated polyphenyls, etc.); alkylated diphenyl ethers and alkylated diphenyl sulfides and the derivatives, analogs and homologs thereof and the like.

Alkylene oxide polymers and interpolymers and derivatives thereof where the terminal hydroxyl groups have been modified by esterification, etherification, etc. constitute another class of known synthetic lubricating oils. These are exemplified by the oils prepared through polymerization of ethylene oxide or propylene oxide, the alkyl and aryl ethers of these polyoxyalkylene polymers (e.g., methylpolyisopropylene glycol ether having an average molecular weight of 1000, diphenyl ether of polyethylene glycol having a molecular weight of 500–1000, diethyl ether of polypropylene glycol having a molecular weight of 1000–1500, etc.) or mono- and polycarboxylic esters thereof, for example, the acetic acid esters, mixed $C_3$–$C_8$ fatty acid esters, or the $C_{13}$Oxo acid diester of tetraethylene glycol.

Another suitable class of synthetic lubricating oils comprises the esters of dicarboxylic acids (e.g., phthalic acid, succinic acid, alkyl succinic acids, alkenyl succinic acids, maleic acid, azelaic acid, suberic acid, sebacic acid, fumaric acid, adipic acid, linoleic acid dimer, malonic acid, alkyl malonic acids, alkenyl malonic acids, etc.) with a variety of alcohols (e.g., butyl alcohol, hexyl alcohol, dodecyl alcohol, 2-ethylhexyl alcohol, ethylene glycol, diethylene glycol monoether, propylene glycol, etc.). Specific examples of these esters include dibutyl adipate, di(2-ethylhexyl)sebacate, di-n-hexyl fumarate, dioctyl sebacate, diisooctyl azelate, diisodecyl azelate, dioctyl phthalate, didecyl phthalate, dieicosyl sebacate, the 2-ethylhexyl diester of linoleic acid dimer, the complex ester formed by reacting one mole of sebacic acid with two moles of tetraethylene glycol and two moles of 2-ethylhexanoic acid and the like.

Esters useful as synthetic oils also include those made from $C_5$ to $C_{12}$ monocarboxylic acids and polyols and polyol ethers such as neopentyl glycol, trimethylol propane, pentaerythritol, dipentaerythritol, tripentaerythritol, etc.

Silicon-based oils such as the polyalkyl-, polyaryl-, polyalkoxy-, or polyaryloxy-siloxane oils and silicate oils comprise another useful class of synthetic lubricants (e.g., tetraethyl silicate, tetraisopropyl silicate, tetra-(2-ethylhexyl)silicate, tetra-(4-methyl-hexyl)silicate, tetra-(p-tert-butylphenyl)silicate, hexyl-(4-methyl-2-pentoxy)disiloxane, poly(methyl)siloxanes, poly(methyl-phenyl)siloxanes, etc.). Other synthetic lubricating oils include liquid esters of phosphorus-containing acids (e.g., tricresyl phosphate, trioctyl phosphate, diethyl ester of decane phosphonic acid, etc.), polymeric tetrahydrofurans and the like.

Unrefined, refined and rerefined oils, either natural or synthetic (as well as mixtures of two or more of any of these) of the type disclosed hereinabove can be used in the lubricant compositions of the present invention. Unrefined oils are those obtained directly from a natural or synthetic source without further purification treatment. For example, a shale oil obtained directly from retorting operations, a petroleum oil obtained directly from primary distillation or ester oil obtained directly from an esterification process and used without further treatment would be an unrefined oil. Refined oils are similar to the unrefined oils except they have been further treated in one or more purification steps to improve one or more properties. Many such purification techniques are known to those skilled in the art such as solvent extraction, secondary distillation, acid or base extraction, filtration, percolation, etc. Rerefined oils are obtained by processes similar to those used to obtain refined oils applied to refined oils which have been already used in service. Such rerefined oils are also known as reclaimed or reprocessed oils and often are additionally processed by techniques directed to removal of spent additives and oil breakdown products.

In general, about 0.05–20.0 parts, usually about 1–10 parts, of the compositions of this invention are dissolved or stably dispersed in 100 parts of oil to produce a satisfactory lubricant. The invention also contemplates the use of other additives in combination with the composition of this invention. Such additives include, for example, auxiliary detergents and dispersants of the ash-producing or ashless type, oxidation inhibiting agents, pour point depressing agents, extreme pressure agents, color stabilizers and anti-foam agents.

The ash-producing detergents are exemplified by oil-soluble neutral and basic salts of alkali or alkaline earth metals with sulfonic acids, carboxylic acids, or organic phosphorus acids chracterized by at least one direct carbon-to-phosphorus linkage such as those prepared by the treatment of an olefin polymer (e.g., polyisobutene having a molecular weight of 1000) with a phosphorizing agent such as phosphorus trichloride, phosphorus heptasulfide, phosphorus pentasulfide, phosphorus trichloride and sulfur, white phosphorus and a sulfur halide, or phosphorothioic chloride. The most commonly used salts of such acids are those of sodium, potassium, lithium, calcium, magnesium, strontium and barium.

The term "basic salt" is used to designate metal salts wherein the metal is present in stoichiometrically larger amounts than the organic acid radical. The commonly employed methods for preparing the basic salts involve heating a mineral oil solution of an acid with a stoichiometric excess of a metal neutralizing agent such as the metal oxide, hydroxide, carbonate, bicarbonate, or sulfide at a temperature above 50° C. and filtering the resulting mass. The use of a "promoter" in the neutralization step to aid the incorporation of a large excess of metal likewise is known. Examples of compounds useful as the promoter include phenolic substances such as phenol, naphthol, $C_{6-26}$ alkylphenols, thiophenol, sulfurized alkylphenol, and condensation products of formaldehyde with a phenolic substance; $C_{1-20}$ alcohols such as methanol, 2-propanol, octyl alcohol, cellosolve, carbitol, ethylene glycol, stearyl alcohol, and cyclohexyl alcohol; and $C_{1-20}$ amines such as aniline, phenylenediamine, phenothiazine, phenyl-$\beta$-naphthylamine, and dodecylamine. A particularly effective method for preparing the basic salts comprises mixing an acid with an excess of a basic alkaline earth metal neutralizing agent and at least one alcohol promoter, and carbonating the mixture at an elevated temperature such as 60°–200° C.

Ashless detergents and dispersants are so called despite the fact that, depending on its constitution, the dispersant may upon combustion yield a non-volatile material such as boric oxide or phosphorus pentoxide; however, it does not ordinarily contain metal and therefore does not yield a metal-containing ash on combustion. Many types are known in the art, and any of them are suitable for use in the lubricants of this invention. The following are illustrative:

(1) Reaction products of carboxylic acids (or derivatives thereof) containing at least about 34 and preferably at least about 54 carbon atoms with nitrogen-containing compounds such as amines, organic hydroxy compounds such as phenols and alcohols, and/or basic inorganic materials. Examples of these "carboxylic dispersants" are described in British Pat. No. 1,306,529 and in many U.S. Patents, including the following:

| | | |
|---|---|---|
| 3,163,603 | 3,351,552 | 3,541,012 |
| 3,184,474 | 3,381,022 | 3,542,678 |
| 3,215,707 | 3,399,141 | 3,542,680 |
| 3,219,666 | 3,415,750 | 3,567,637 |
| 3,271,310 | 3,433,744 | 3,574,101 |
| 3,272,746 | 3,444,170 | 3,576,743 |
| 3,281,357 | 3,448,048 | 3,630,904 |
| 3,306,908 | 3,448,049 | 3,632,510 |
| 3,311,558 | 3,451,933 | 3,632,511 |
| 3,316,177 | 3,454,607 | 3,697,428 |
| 3,340,281 | 3,467,668 | 3,725,441 |
| 3,341,542 | 3,501,405 | Re 26,433 |
| 3,346,493 | 3,522,179 | |

(2) Reaction products of relatively high molecular weight aliphatic or alicyclic halides with amines, preferably polyalkylene polyamines. These may be characterized as "amine dispersants" and examples thereof are described, for example, in the following U.S. Patents:

| | |
|---|---|
| 3,275,554 | 3,454,555 |
| 3,438,757 | 3,565,804 |

(3) Products obtained by post-treating the carboxylic or amine dispersants with such reagents as urea, thiourea, carbon disulfide, aldehydes, ketones, carboxylic acids, hydrocarbon-substituted succinic anhydrides, nitriles, epoxides, boron compounds, phosphorus compounds or the like. Exemplary materials of this kind are described in the following U.S. Patents:

| | | |
|---|---|---|
| 3,036,003 | 3,367,943 | 3,579,450 |
| 3,087,936 | 3,373,111 | 3,591,598 |
| 3,200,107 | 3,403,102 | 3,600,372 |
| 3,216,936 | 3,442,808 | 3,639,242 |
| 3,254,025 | 3,455,831 | 3,649,229 |
| 3,256,185 | 3,455,832 | 3,649,659 |
| 3,278,550 | 3,493,520 | 3,658,836 |
| 3,280,234 | 3,502,677 | 3,697,574 |
| 3,281,428 | 3,513,093 | 3,702,757 |
| 3,282,955 | 3,533,945 | 3,703,536 |
| 3,312,619 | 3,539,633 | 3,704,308 |
| 3,366,569 | 3,573,010 | 3,708,522 |

(4) Interpolymers of oil-solubilizing monomers such as decyl methacrylate, vinyl decyl ether and high molecular weight olefins with monomers containing polar substituents, e.g., aminoalkyl acrylates or acrylamides and poly-(oxyethylene)-substituted acrylates. These may be characterized as "polymeric dispersants" and examples thereof are disclosed in the following U.S. Patents:

| | |
|---|---|
| 3,329,658 | 3,666,730 |
| 3,449,250 | 3,687,849 |
| 3,519,565 | 3,702,300 |

The pertinent disclosures of all of the above-noted patents are incorporated by reference herein.

Extreme pressure agents and corrosion-inhibiting and oxidation-inhibiting agents are exemplified by chlorinated aliphatic hydrocarbons such as chlorinated wax; organic sulfides and polysulfides such as benzyl disulfide, bis(chlorobenzyl)disulfide, dibutyl tetrasulfide, sulfurized methyl ester of oleic acid, sulfurized alkylphenol, sulfurized dipentene, and sulfurized terpene; phosphosulfurized hydrocarbons such as the reaction product of a phosphorus sulfide with turpentine or methyl oleate; phosphorus esters including principally dihydrocarbon and trihydrocarbon phosphites such as dibutyl phosphite, diheptyl phosphite, dicyclohexyl phosphite, pentyl phenyl phosphite, dipentyl phenyl phosphite, tridecyl phosphite, distearyl phosphite, dimethyl naphthyl phosphite, oleyl 4-pentylphenyl phosphite, polypropylene (molecular weight 500)-substituted phenyl phosphite, diisobutyl-substituted phenyl phosphite; metal thiocarbamates, such as zinc dioctyldithiocarbamate, and barium heptylphenyl dithiocarbamate; Group II metal phosphorodithioates such as zinc dicyclohexylphosphorodithioate, zinc dioctylphosphorodithioate, barium di(heptylphenyl)-phosphorodithioate, cadmium dinonylphosphorodithioate, and the zinc salt of a phosphorodithioic acid produced by the reaction of phosphorus pentasulfide with an equimolar mixture of isopropyl alcohol and n-hexanol.

The fuel compositions of the present invention contain a major proportion of a normally liquid fuel, usually a hydrocarbonaceous petroleum distillate fuel such as motor gasoline as defined by ASTM Specification D-439-73 and diesel fuel or fuel oil as defined by ASTM Specification D-396. Normally liquid fuel compositions comprising non-hydrocarbonaceous materials such as alcohols, ethers, organo-nitro compounds and the like (e.g., methanol, ethanol, diethyl ether, methyl ethyl ether, nitromethane) are also within the scope of this invention as are liquid fuels derived from vegetable or mineral sources such as corn, alfalfa, shale and coal. Normally liquid fuels which are mixtures of one or more hydrocarbonaceous fuels and one or more non-hydrocarbonaceous materials are also contemplated. Examples of such mixtures are combinations of gasoline and ethanol, diesel fuel and ether, gasoline and nitromethane, etc. Particularly preferred is gasoline, that is, a mixture of hydrocarbons having an ASTM boiling point of 60° C. at the 10% distillation point to about 205° C. at the 90% distillation point.

Generally, these fuel compositions contain an amount of the compositions of this invention sufficient to impart dispersant and detergent properties to the fuel; usually this amount is about 1 to about 10,000 preferably 4 to 1,000 parts by weight of the reaction product per million parts by weight of fuel. The preferred gasoline-based fuel compositions generally exhibit excellent engine sludge dispersancy and detergency properties. In addition, they exhibit anti-rust and carburetor/fuel line deposit-removing and deposit-inhibiting properties.

The fuel compositions of this invention can contain, in addition to the compositions of this invention, other additives which are well known to those of skill in the art. These can include anti-knock agents such as tetraalkyl lead compounds, lead scavengers such as haloalkanes (e.g., ethylene dichloride and ethylene dibromide), deposit preventors or modifiers such as triaryl phosphates, dyes, cetane improvers, anti-oxidants such as 2,6-di-tertiarybutyl-4-methylphenol, rust inhibitors, such as alkylated succinic acids and anhydrides, bacteriostatic agents, gum inhibitors, metal deactivators, demulsifiers, upper cylinder lubricants, anti-icing agents and the like.

In certain preferred fuel compositions of the present invention, the afore-described compositions of this invention are combined with other ashless dispersants in gasoline. Such ashless dispersants are preferably esters of a mono- or polyol and a high molecular weight mono- or polycarboxylic acid acylating agent containing at least 30 carbon atoms in the acyl moiety. Such esters are well known to those of skill in the art. See, for example, French Pat. No. 1,396,645, British Pat. Nos. 981,850 and 1,055,337 and U.S. Pat. Nos. 3,255,108; 3,311,558; 3,331,776; 3,346,354; 3,522,179; 3,579,450; 3,542,680; 3,381,022; 3,639,242; 3,697,428; 3,708,522; and British Patent Specification No. 1,306,529. These patents are expressly incorporated herein by reference for their disclosure of suitable esters and methods for their preparation. Generally, the weight ratio of the compositions of this invention to the aforesaid ashless dispersants is about 0.1 to about 10.0; preferably about 1 to about 10 parts of composition of this invention to 1 part ashless dispersant.

In still another embodiment of this invention, the inventive additives for fuels and lubricants are combined with Mannich condensation products formed from substituted phenols, aldehydes, polyamines, and amino pyridines. Such condensation products are described in U.S. Pat. Nos. 3,649,659; 3,558,743; 3,539,633; 3,704,308; and 3,725,277.

The compositions of this invention can be added directly to the fuel or lubricating oil to form the fuel and lubricant compositions of this invention or they can be diluted with a substantially inert, normally liquid organic solvent/diluent such as mineral oil, xylene, or a normally liquid fuel as described above, to form an additive concentrate which is then added to the fuel or lubricating oil in sufficient amounts to form the inventive fuel and lubricant composition described herein. These concentrates generally contain about 10–90, usually 20–80 percent of the composition of this invention and can contain in addition any of the above-described conventional additives, particularly the afore-described ashless dispersants including Mannich condensates in the aforesaid proportions. The remainder of the concentrate is the solvent/diluent.

What is claimed is:

1. A composition of matter made by reacting
   (A) at least one mono-substituted phenol represented by the formula

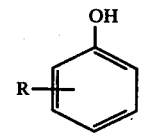

wherein R is a purely hydrocarbyl substituent having an average of about 50 to about 300 carbon atoms; with
   (B) formaldehyde or reactive equivalent thereof; and
   (C) phenol, $C_6H_5OH$.

2. A concentrate for formulating additives for normally liquid fuels or oils of lubricating viscosity which comprises about 10 to about 90 weight percent of the composition claimed in claim 1 and a substantially inert, normally liquid organic solvent/diluent.

3. A lubricant composition comprising a major amount of an oil of lubricating viscosity and a minor amount of a composition as claimed in claim 1.

4. A fuel composition comprising a major amount of a normally liquid fuel and a minor amount of a composition as claimed in claim 1.

* * * * *